United States Patent
Karstens

(10) Patent No.: US 7,490,299 B2
(45) Date of Patent: Feb. 10, 2009

(54) SYSTEM AND METHOD FOR HANDLING UNEXPECTED FOCUS CHANGE MESSAGES IN A COMPUTING DEVICE

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 10/881,640

(22) Filed: Jun. 30, 2004

(65) Prior Publication Data

US 2006/0005142 A1    Jan. 5, 2006

(51) Int. Cl.
G06F 3/048  (2006.01)
G06F 3/00   (2006.01)

(52) U.S. Cl. .............. 715/802; 715/808; 715/767; 719/318; 710/48

(58) Field of Classification Search ............... 719/318; 710/48; 715/808, 802, 767, 766
See application file for complete search history.

(56) References Cited

U.S. PATENT DOCUMENTS

| | | | | |
|---|---|---|---|---|
| 5,448,695 A | * | 9/1995 | Douglas et al. | 715/809 |
| 5,613,163 A | * | 3/1997 | Marron et al. | 710/59 |
| 5,721,849 A | * | 2/1998 | Amro | 715/802 |
| 5,790,127 A | * | 8/1998 | Anderson et al. | 715/802 |
| 5,821,928 A | * | 10/1998 | Melkus et al. | 715/809 |
| 5,826,015 A | * | 10/1998 | Schmidt | 726/23 |
| 5,859,640 A | * | 1/1999 | de Judicibus | 715/710 |
| 5,877,763 A | * | 3/1999 | Berry et al. | 715/803 |
| 6,005,575 A | * | 12/1999 | Colleran et al. | 715/807 |
| 6,018,341 A | * | 1/2000 | Berry et al. | 715/794 |
| 6,301,573 B1 | * | 10/2001 | McIlwaine et al. | 706/61 |
| 6,463,078 B1 | * | 10/2002 | Engstrom et al. | 370/466 |
| 6,968,509 B1 | * | 11/2005 | Chang et al. | 715/802 |
| 7,380,218 B2 | * | 5/2008 | Rundell | 715/808 |
| 2004/0061716 A1 | * | 4/2004 | Cheung et al. | 345/710 |
| 2004/0140901 A1 | * | 7/2004 | Marsh | 340/574 |
| 2005/0055416 A1 | * | 3/2005 | Heikes et al. | 709/207 |
| 2005/0198589 A1 | * | 9/2005 | Heikes et al. | 715/805 |

* cited by examiner

*Primary Examiner*—Tadesse Hailu
*Assistant Examiner*—Nicholas S Ulrich
(74) *Attorney, Agent, or Firm*—Coats & Bennett, P.L.L.C.

(57) ABSTRACT

A system and method for managing non-user initiated focus changes in a computing device detects, in one embodiment, an operating system generated message indicating a focus change from a first window to a second window. Once detected, user input is inhibited for a predetermined time. The predetermined time is configurable by the user. After the predetermined time elapses, subsequent user input is permitted to be sent to the second window, which has the focus.

19 Claims, 4 Drawing Sheets

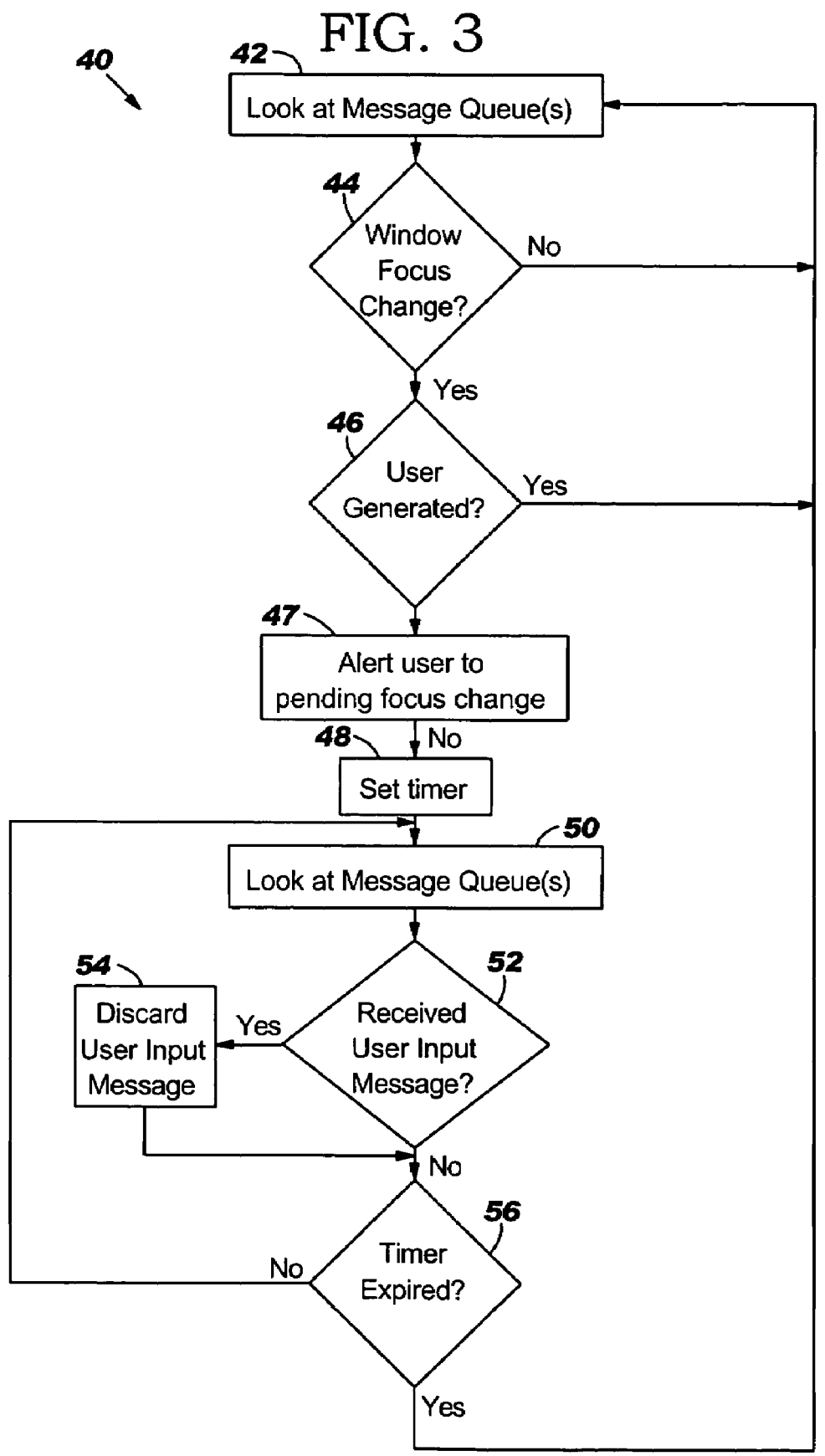

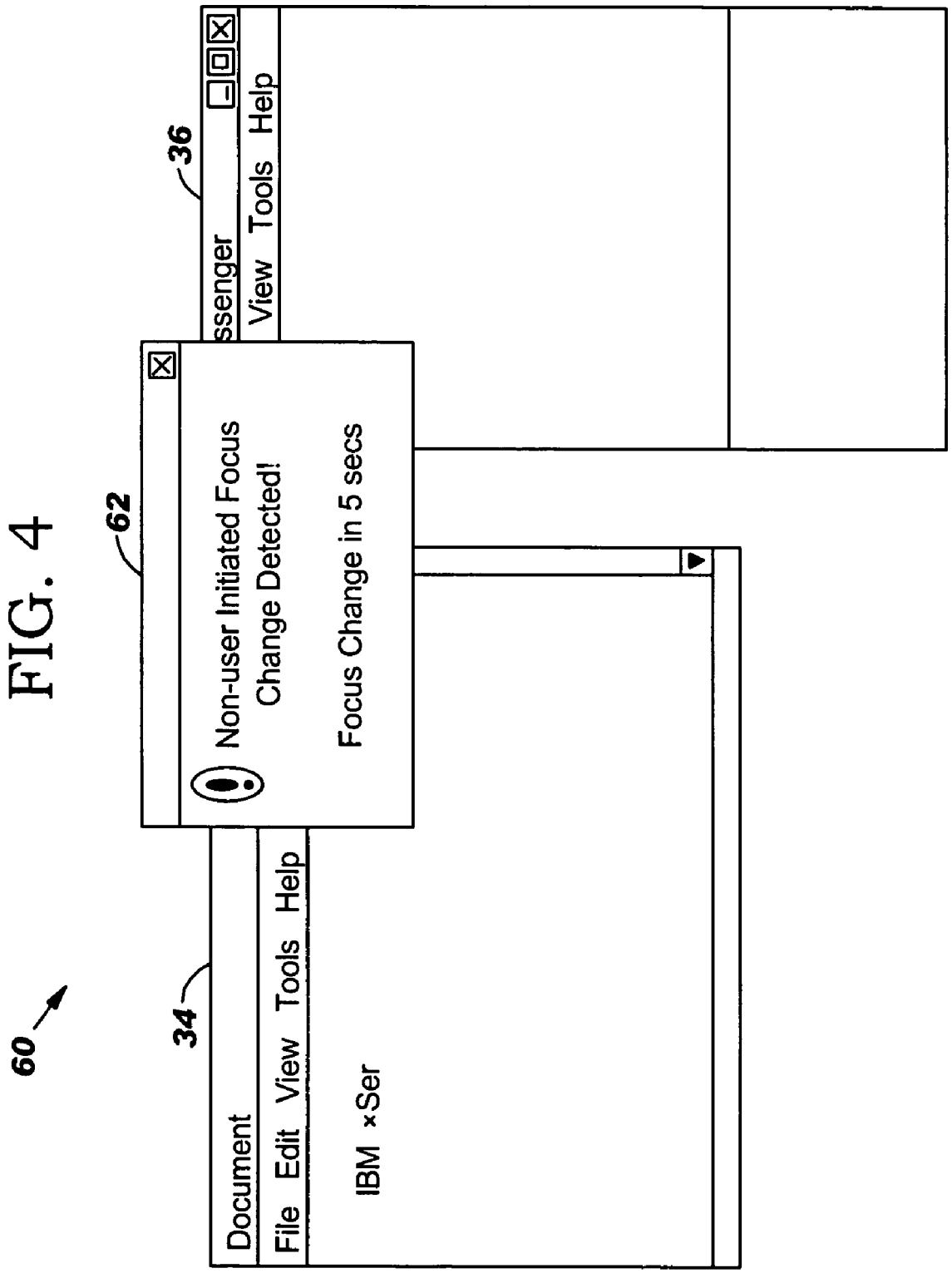

SYSTEM AND METHOD FOR HANDLING UNEXPECTED FOCUS CHANGE MESSAGES IN A COMPUTING DEVICE

BACKGROUND

The present invention relates generally to software, and particularly to managing operating system messages sent to an application window upon the invocation of a system-generated focus change.

Most computers have a special software package called an operating system that is responsible for managing many of the computer's normal functions. One such function is the ability to direct keyboard input to an application that may be one of many applications executing simultaneously. Because the user can only work in one window at a time, the operating system automatically sends all keyboard input to the "active window." This ensures that all keystrokes go to the program the user is currently using. This paradigm works well so long as the user is aware of which window has the "input focus." However, it can present a rather bothersome side effect.

For example, consider a user who edits a document in a first application window, and conducts an on-line chat session in a second application window. While the first application window has the input focus, the operating system delivers all keystrokes to that application process. If an instant message arrives for the second application window, however, the operating system may change the input focus from the first window to the second window unbeknownst to the user. In these cases, the user may continue to type believing that he is editing the document in the first window, when in fact, whatever he is typing is actually being entered into (and possibly sent from) the on-line chat application running in the second window. Thus, the user would benefit from knowing when a non-user initiated focus change occurs to prevent text and other user input from being entered unknowingly into another application window.

SUMMARY

The present invention addresses this behavior by providing a system and method for managing focus changes. In one embodiment, a computer comprises a controller, such as a microprocessor. The controller is configured to detect an operating system generated message indicating a focus change from a first window to a second window. Once detected, the controller is configured to inhibit user input for a predetermined time. The predetermined time is configurable by the user. After the predetermined time elapses, the controller is configured to permit subsequent user input to be sent to the second window, which has the focus.

BRIEF DESCRIPTION OF THE DRAWINGS

FIG. 3 illustrates a method according to one embodiment of the present invention.

FIG. 4 illustrates how a user might be presented with an alert according to one embodiment of the present invention.

DETAILED DESCRIPTION

Figure 1:
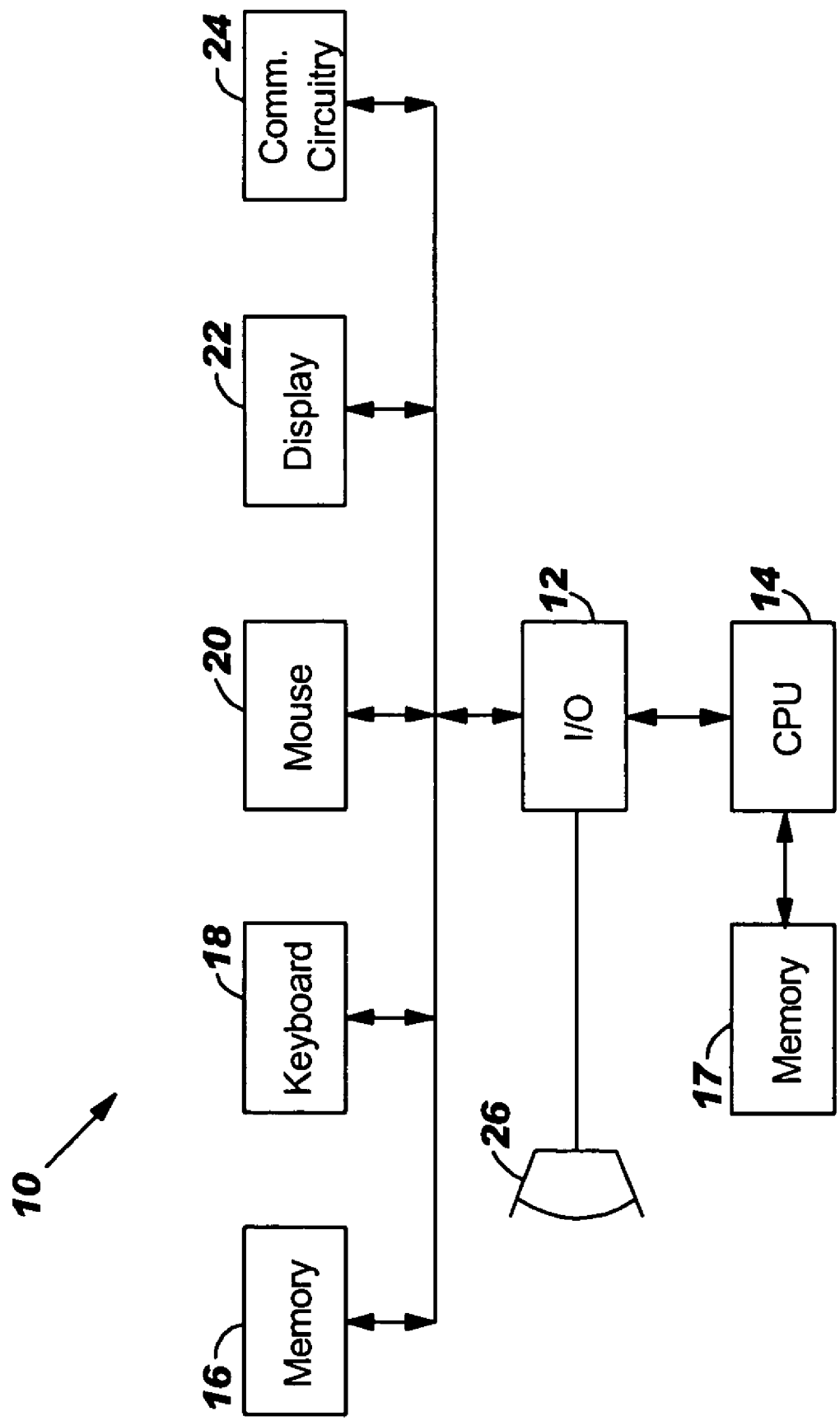
FIG. 1 illustrates a block diagram of an exemplary computing device that operates according to one embodiment of the present invention.

Referring now to FIG. 1, a computing device that operates according to one embodiment of the present invention is shown therein and indicated generally by the number 10. Computing device 10 is any computer known in the art, for example, a personal or laptop computer, and comprises input/output circuitry 12, a controller 14, first memory 16, second memory 17, a keyboard 18, a mouse 20, a display 22, communication circuitry 24, and an audio speaker 26.

Input/output circuit 12 interfaces controller 14 with first memory 16, keyboard 18, mouse 20, display 22, communication circuitry 24, and audio speaker 26. Data and command signals are communicated between each of these components and controller 14 via input output circuit 12. As is understood in the art, input/output circuit 12 and controller 14 may be integrated as an application-specific integrated circuit (ASIC).

Controller 14 comprises, for example, a microprocessor that controls the operation of computing device 10 according to program instructions stored in first memory 16 and/or second memory 17. The control functions may be implemented in a single microprocessor, or in multiple microprocessors. Suitable controllers 14 may include, but are not limited to, any of the family of microprocessors manufactured by INTEL, MOTOROLA, IBM, and AMD.

First memory 16 represents the entire hierarchy of memory in computing device 10 including random access memory (RAM), read-only memory (ROM), and disk-based storage (e.g., hard drives, floppy drives, and CDs). Computer program instructions and data required for the operation of computing device 10 are stored in first memory 16. Controller 14 reads from and writes to first memory 16 via input/output circuit 12. Some examples of program instructions stored in first memory 16 include the operating system, and application software. As will be described later in more detail, first memory 16 may also store program instructions for carrying out the various embodiments of the present invention.

Second memory 17 also comprises RAM and/or ROM and may be embodied as system cache, for example. The type of program instructions and data stored in second memory 17 is that which typically requires fast access by controller 14. Examples include the system BIOS and other data frequently used by controller 14 to control device 10 and the application processes stored thereon. Controller 14 may access second memory 17 via a memory management unit (not shown), or directly.

Keyboard 18 and mouse 20 are input devices that permit the user to input data and command signals to computing device 10. As is known in the art, keyboard 18 and mouse 20 permits a user to enter alphanumeric data and control the operation of application programs executing on computing device 10. Display 22 is an output device that displays application output to the user. Communication circuitry 24 may comprise devices such as cable modems, wireless modems, or other interfaces that permit the user of device 10 to communicate with other similarly enabled devices via a computing network (not shown). Speaker 26 receives analog signals from controller 14 and outputs these signals as audio to the user.

Figure 2:
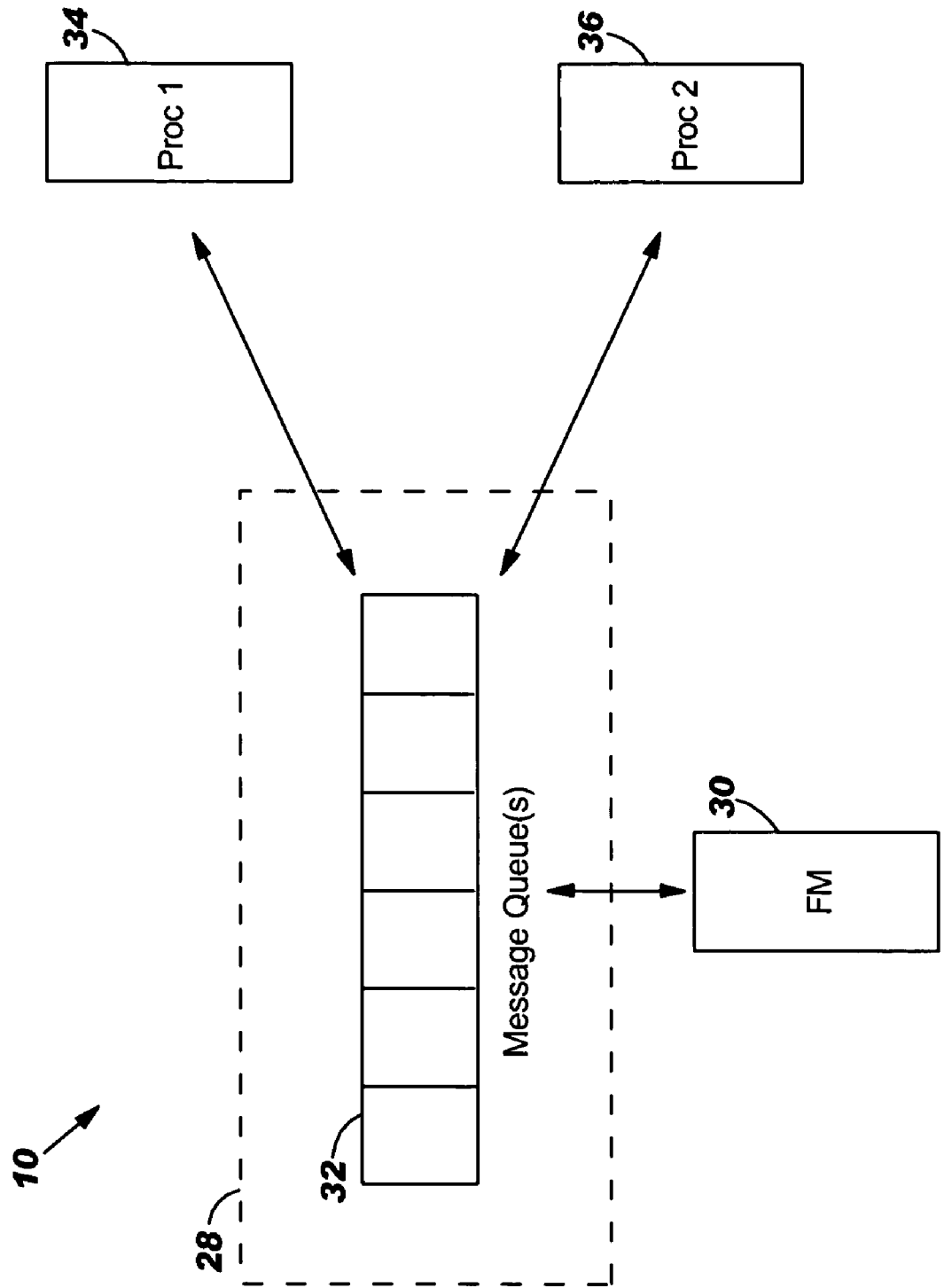
FIG. 2 illustrates possible interaction between one embodiment of the present invention, the operating system, and the processes executing on the computing device of FIG. 1.

FIG. 2 illustrates interaction between one embodiment of the present invention, the operating system, and one or more application processes running on computing device 10. Computing device 10 stores program instructions that define its operating system 28 in first memory 16. Controller 14 executes these instructions to translate user input commands from keyboard 18 and mouse 20, allocate and maintain computer resources, and control application access to devices such as printers (not shown), display 22, communication circuitry 24, and first memory 16. Some examples of operating systems 28 that may operate on computing device 10 are MICROSOFT WINDOWS, UNIX, LINUX, and MAC OS. Other operating systems may also operate on computing device 10.

Some operating systems 28, such as WINDOWS, control one or more application processes 34, 36 by communicating messages. These messages may originate from the applications themselves, input devices such as keyboard 18 and/or mouse 20, other computing devices via communication circuitry 24, or even from operating system 28. When the operating system 28 wants to send a message to process 34, 36, it places the message on a first-in-first-out (FIFO) message queue 32 for later retrieval by processes 34, 36.

Most messages are notifications to the application processes 34, 36 that some event of interest has occurred. By way of example, consider process 34 as currently having the input focus. Therefore, operating system 28 directs all input from keyboard 18 or other user input device to the process 34. When a user of process 34 presses a key on keyboard 18, for example, an interrupt is generated and passed to a low-level keyboard driver (not shown). The driver then calls an API in the operating system 28 to translate the interrupt into a message. The operating system 28 places the resulting message on message queue 32 for later retrieval by process 34.

Likewise, the operating system also notifies processes 34, 36 when a change in focus occurs. A focus change from one window to another may occur when the user clicks on a non-active window, or when the operating system 28 generates the focus change responsive to some external event, such as an incoming message meant for a non-active process.

To illustrate the possible messaging that occurs whenever the focus changes between windows, consider computing device 10 receiving an instant message meant for process 36 while process 34 has the input focus. When the instant message is received by communication circuitry 24, an interrupt is generated and handled by a communication driver (not shown). Like the keyboard driver, the communication driver may call an API in operating system 28 indicating the arrival of the incoming instant message. Operating system 28 may then generate and place two messages on message queue 32. The first is a message for process 34 indicating that it will lose the input focus. The second is a message for process 36 indicating that it is receiving the input focus. Of course, the associated text of the instant message for process 36 is also placed on message queue 32. When process 36 retrieves the change focus message from message queue 32, it also receives the input focus, and as such, receives all user input subsequently entered from keyboard 18.

As stated above, this paradigm works well when the user is aware of an impending change in focus. However, a problem occurs whenever the user is unaware of the focus change. In the above example, the focus changed from a window associated with process 34 to a window associated with process 36. Because the user was unaware of the focus change, the user may have continued to type or provide other user input believing that the window associated with process 34 still had the input focus. Therefore, it is possible that operating system 28 placed one or more user input messages meant for process 34 in message queue 32 after placing the messages indicating the focus change to process 36 in message queue 32.

To solve this problem, the present invention contemplates a focus monitor 30. Focus monitor 30 monitors message queue 32 for the existence of focus change messages. When focus monitor 30 detects that operating system has placed a focus change on message queue 32, it proceeds to "look" for messages indicating user input from keyboard 18 or other user input device in message queue 32. Focus monitor 30 then discards the user input messages for a predetermined time. That is, focus monitor 30 inhibits user input originally meant for process 34 from reaching process 36 when the system-generated focus change occurs.

The predetermined time may be user configurable, or may be set by operating system 28 based on any number of criteria. In one embodiment, the user sets the predetermined time for a few seconds, but it should be understood that focus monitor 30 may be configured for any length of time. Once the predetermined time has elapsed, focus monitor 30 ceases to discard the user input messages on queue 32, and begins to monitor for another focus change.

FIG. 3 illustrates one method 40 by which focus monitor 30 may operate. Focus monitor 30 begins by looking at the message queue 32 (box 42) for one or more messages indicating a change in focus (box 44). These messages may, for example, be WM_KILLFOCUS or WM_SETFOCUS messages as sent by WINDOWS to the application processes 34, 36. Of course, those skilled in the art will appreciate that the message types and structures may vary with the type of operating system 28 employed. Further, focus monitor 30 may be configured to analyze multiple messages of various types to determine whether a focus change is pending. Focus monitor 30 may ignore other messages not indicating a change in focus, and simply continue to look at message queue 32 (box 42).

Messages that indicate a change in focus may contain parameters that identify which application process is losing the input focus, and which application process is gaining the input focus. If permitted by the operating system 28, focus monitor 30 reads these values and stores them in local variables. Likewise, focus monitor 30 may also determine whether the change in focus message was initiated by the user, or by the operating system 28 (box 46). If the focus change were user-initiated, focus monitor 30 would ignore the next WM_KILLFOCUS or WM_SETFOCUS messages, as well as any keyboard 18 input messages, because the user is aware of the change in focus.

In one embodiment, focus monitor 30 distinguishes a user-initiated focus change by looking for a series of messages passed between the application process gaining the input focus and the operating system. In WINDOWS, for example, WM_NCHITTEST messages are placed on the message queue 32 whenever a mouse click occurs over an inactive window. Typically, the application process over which the mouse click occurred sends a return message to WINDOWS, which then places a WM_MOUSEACTIVATE message on message queue 32 for the application process. The application process responds to the WM_MOUSEACTIVATE message with either an MA_ACTIVATE or MA_ACTIVATEANDEAT message, indicating that the operating system 28 should activate the application process window.

If the change in focus is not user-initiated, focus monitor 30 may alert the user to the impending focus change (box 47), and start a timer (box 48). For example, focus monitor 30 may cause an audible sound to be rendered through speaker 26 or, if permitted by the operating system, display a dialog. The timer will run for a predetermined period that is configured by the user. While the timer runs, focus monitor 30 looks at the message queue 32 for messages indicating user input, for example, input from keyboard 18 (box 50). In WINDOWS, these messages include WM_KEYUP, WM_KWYDOWN, WM_SYSKEYUP, and WM_SYSKEYDOWN. If focus monitor 30 sees these messages on message queue 32 (box 52), it discards them to prevent the application gaining the input focus from using the keyboard 18 inputs (box 54). Of course, other messages may be ignored.

Focus monitor 30 then checks the timer to determine if it has expired (box 56). If the timer has not yet expired, focus monitor 30 continues looking for and discarding keyboard 18 input messages (boxes 50, 52, 54). If the timer has expired, focus monitor 30 ceases to intercept and discard keystroke messages, and returns to the beginning to detect the next system-generated change in focus (box 42).

As previously stated, the present invention may alert the user whenever a non-user initiated focus change is pending. FIG. 4 illustrates how the alert in one embodiment of the present invention may appear to the user. Dialog window 62 on desktop 60 may be a modal type window that presents the user with a message indicating that a focus change is pending. In this embodiment, dialog window 62 is placed in the foreground and is accompanied with a visual representation of the timer value as the timer counts down the predetermined time.

If desired, the presentation of dialog window 62 may also be accompanied with audio signals from speaker 26. In FIG. 4, for example, application process 34 originally had the input focus, and the user was typing the text "IBM xSeries" in the window. As the user was typing, an instant message was received from a remote user. This caused the operating system 28 to automatically change the focus from the window associated with application process 34 to the window associated with application process 36. Here, the only keyboard 18 input entered into application process 34 was "IBM xSer" before the change in focus to application process 36. Focus monitor 30 displayed dialog window 62 accompanied by an audio "beep" to warn the user of the impending focus change, and discarded the "ies" portion of the text. Once the predetermined time elapses, focus monitor 30 will permit subsequent input from the keyboard 18, or other user input device, to reach application process 36.

Those skilled in the art will realize that any programming language may be used to implement focus monitor 30. Examples include, but are not limited to, C/C++ and Java. Of course, implementation will also vary upon the type of operating system 28 used by computing device 10. For example, the present invention may be implemented by software invoking one or more system calls or subroutines. For example, in a WINDOWS environment it may be possible to employ hooks provided by the operating system 28. These hooks include "WH_KEYBOARD," "WH_MSGFILTER," and "WH_SYSMSGFILTER" that monitor the WINDOWS system message queue for keyboard 18 events and system events. Additionally, focus monitor 30 may be implemented as a Dynamic Link Library (DLL). In this case, all operating processes could have access to the functionality of focus monitor 30. Conceptually similar methods of implementation may be employed in other operating systems 28, such as UNIX, LINUX, and MAC OS.

Further, it should be noted that the figures indicate message queue 32 as a single queue merely for illustrative purposes. Message queue 32 may in fact be multiple queues as defined by operating system 28. For example, the WINDOWS operating system utilizes one system queue for the system, and one application queue for each process. Focus monitor 30 would therefore be capable of monitoring focus change messages and discarding input messages from user input devices on the system queue, or any of the application queues, or any combination of the queues thereof. Additionally, the previous embodiments have described the input messages in terms of keyboard messages that are generated whenever the user enters alphanumeric data using keyboard 18. However, the present invention is not limited solely to keyboard input. Rather, focus monitor 30 may be configured to discard user input messages generated by any user input device known in the art.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of managing a change in focus between windows in a Graphical User Interface (GUI) comprising:
   detecting a non-user initiated focus change from a first window having said focus to a second window;
   displaying a third window to alert said user to said focus change;
   setting a timer to a predetermined time;
   inhibiting user-generated alpha-numeric input for said predetermined time responsive to said focus change detection by:
      monitoring a message queue for one or more input messages while said timer is not expired; and
      discarding said one or more input messages while said timer is not expired; and
   permitting subsequent user-generated alpha-numeric input to reach said second window after said predetermined time has expired.

2. The method of claim 1 wherein said user-generated alpha-numeric input is generated by a user input device.

3. The method of claim 1 wherein detecting a focus change comprises monitoring a message queue for a message indicating said focus change from said first window to said second window.

4. The method of claim 3 wherein said message queue comprises a system message queue.

5. The method of claim 3 wherein said message queue comprises an application message queue.

6. The method of claim 1 wherein said user configures said predetermined time.

7. The method of claim 1 wherein said message queue comprises a system message queue.

8. The method of claim 1 wherein said message queue comprises an application message queue.

9. The method of claim 1 further comprising automatically changing said focus from said first window to said third window for said predetermined time.

10. The method of claim 9 further comprising automatically changing said focus from said third window to said second window after said predetermined time expires.

11. The method of claim 1 further comprising playing an audio indication to warn said user to said focus change.

12. A computer system comprising:
   a display;
   a keyboard;
   a memory; and
   a controller communicatively connected to said display, said keyboard, and said memory, and configured to:
      monitor a message queue having one or more messages bound for one or more application processes;

detect a non-user initiated focus change from a first window having focus to a second window responsive to said monitoring;
initiate a timer to said predetermined time;
display a third window upon detecting said focus change to alert said user to said focus change; and
inhibit user-generated alpha-numeric input for a predetermined time responsive to said detection by:
  detecting an input message on said message queue while said timer is not expired; and
  discarding said input message while said timer is not expired.

13. The controller of claim 12 wherein said user-generated alpha-numeric input is generated by a user input device.

14. The controller of claim 12 wherein said controller is further configured to permit subsequent user-generated alpha-numeric input to reach said second window after said predetermined time has expired.

15. The controller of claim 12 wherein said controller is further configured to activate an audio indication upon detecting said focus change.

16. A computer readable medium having a software program stored thereon, the software program operative to cause a controller to:

monitor a message queue having one or more messages bound for one or more application processes;
detect a non-user initiated focus change from a first window having focus to a second window responsive to said monitoring;
initiate a timer to a predetermined time;
display a third window upon detecting said focus change; and
inhibit user-generated alpha-numeric input for said predetermined time responsive to said detection by:
  detecting an input message resident on said message queue while said timer has not expired; and
  discarding said input message while said timer is not expired.

17. The computer readable medium of claim 16 wherein said user-generated alpha-numeric input is generated by a user input device.

18. The computer readable medium of claim 16 wherein said software program is further operative to alert said user to said focus change.

19. The computer readable medium of claim 16 wherein said software program is further operative to activate an audio indication upon detecting said focus change.

* * * * *